United States Patent [19]
Donahue, Jr.

[11] Patent Number: 4,558,844
[45] Date of Patent: Dec. 17, 1985

[54] DIRECT ACTING VALVE ASSEMBLY

[75] Inventor: William R. Donahue, Jr., West Lafayette, Ind.

[73] Assignee: Appliance Valves Corporation, West Lafayette, Ind.

[21] Appl. No.: 722,170

[22] Filed: Apr. 11, 1985

[51] Int. Cl.⁴ .............................................. F16K 47/00
[52] U.S. Cl. .................... 251/118; 251/360; 251/361; 251/129.02
[58] Field of Search ........ 251/129, 141, 118, 360–363, 251/30, 454.6

Primary Examiner—Samuel Scott
Assistant Examiner—Noah Kamen
Attorney, Agent, or Firm—Woodard, Weikart, Emhardt & Naughton

[57] ABSTRACT

A direct acting valve assembly including a valve body and a guide tube attached thereto. An insert is secured within the guide tube and includes an upraised valve seat surrounding a central aperture. The valve body includes an annular surface between an annular inlet and a centrally located outlet, and an annular seal is positioned between the annular surface and the insert to provide a fluid tight seal therebetween. The guide tube receives a closure member which carries a valve seal positionable against the upraised valve seat of the insert. A solenoid is operable to move the closure member from a first position displaced from the insert and opening the valve and a second position adjacent the insert and sealing the central passageway.

10 Claims, 4 Drawing Figures

DIRECT ACTING VALVE ASSEMBLY

BACKGROUND OF THE INVENTION

1. Field of the Invention:

The present invention relates to the field of direct acting valve assemblies, and in particular to a valve assembly having an improved structure for the opening and closing of the valve port.

2. Description of the Prior Art:

Direct acting valves are used in a variety of settings and may include a solenoid control to open and close the valve port. Such valves are used, for example, in the control of water flow for ice makers and similar types of low water flow rate devices.

Typical direct acting valves currently in use for these types of application utilize a conically pointed armature which shuts off the fluid flow by dropping into a concave seating pocket made of rubber. This design requires that the armature and concave seating pocket be closely aligned during shut-off. In current designs the armature is located in a guide tube, with liberal clearance to protect against dirt, and the guide tube is located in the valve body. The concave seating pocket (rubber diaphragm) is located in the valve body. Manufacturing tolerances accumulate to the point that the armature tip will "drag" on the side of the concave seating pocket. This drag causes two failure modes. First, failure occurs as a result of severe misalignment by the armature tip not dropping into the sealing pocket. Second, failure occurs over time when the armature tip will wear a groove in the rubber sealing pocket and a slow leak will develop.

In U.S. Pat. No. 3,818,398, issued to Barbier et al. on June 18, 1974, there is disclosed an electromagnet coil assembly used in a valve assembly. The Barbier et al. patent discloses a structure for a valve assembly which includes a pointed plunger which is received by an aperture in a disc. The disc is in turn carried by a valve member, and in its lowermost position closes the valve port.

A variety of pilot operated valve assemblies are disclosed in U.S. Pat. Nos. 4,387,878, issued to Zukausky on June 14, 1983; 4,178,824, issued to Kolze on Nov. 20, 1979; 4,178,573, issued to Swanson on Dec. 11, 1979; 4,175,590, issued to Grandclement on Nov. 27, 1979; and 3,872,878, issued to Kozel et al. on Mar. 25, 1975. These valves utilize a flexible diaphragm carrying an insert which defines a raised surface acting as a valve closure. The solenoid plunger supports a resilient member, such as rubber, positioned to close the raised surface of the diaphragm insert when the plunger is in its lowermost position. Upon closing the raised valve port, the diaphragm and insert move downwardly against the major valve port, to shut off flow of fluid through the valve. The ratio of solenoid plunger diameter to the diameter of the raised surface of the diaphragm insert is such that close alignment of these diameters is not significant in the pilot operated valves.

SUMMARY OF THE INVENTION

Briefly describing one aspect of the present invention there is provided a direct acting valve assembly which includes a guide tube mounted to a valve body, the valve body including an annular surface portion positioned between an annular inlet and a centrally located outlet, an annular seal positioned against the annular surface of the valve body, an insert secured to one of the valve body and the guide tube and including an annular surface positioned adjacent the anular seal, the insert including a central aperture and an upraised valve seat surrounding the central aperture, a closure member received within the guide tube and carrying a valve seal located in alignment with the central opening and positionable upon movement of the closure member to seal with the upraised valve seat of the insert, and means for moving the closure member between open and closed positions relative the insert.

It is an object of the present invention to provide a direct acting valve which is relatively simple and inexpensive to manufacture, and which is reliable in operation.

It is another object of the present invention to provide a direct acting valve assembly which includes a valve closure construction which avoids disadvantages of certain prior art devices due to misalignment of parts or particularly due to tolerance limitations of such earlier designs.

A further object of the present invention is to provide a direct acting valve assembly which permits the manufacture of its component parts without high tolerances associated with prior art designs, which also carry a higher expense as to manufacturing technique.

Further objects and advantages of the present invention will be apparent from the description of the preferred embodiment which follows.

DESCRIPTION OF THE PREFERRED EMBODIMENT

Figure 1:
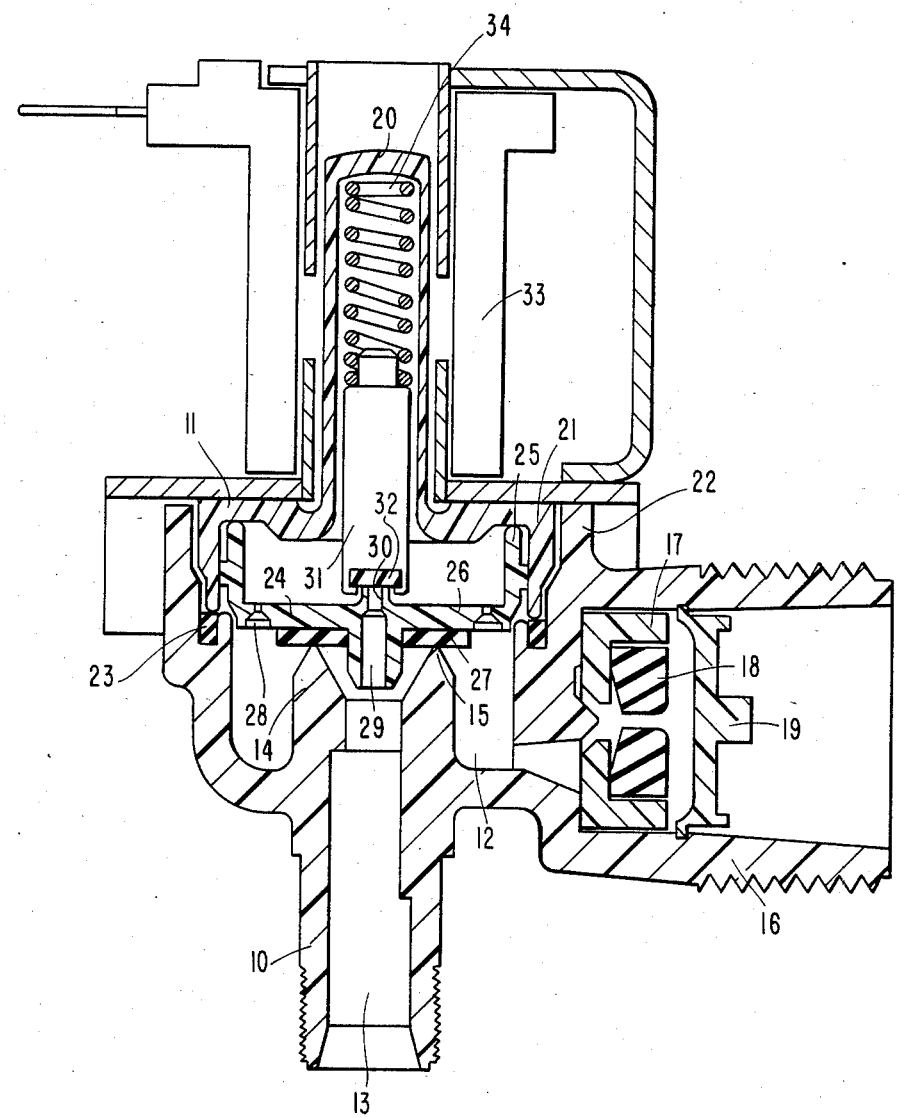
FIG. 1 is a side, cross-sectional view of a direct acting valve assembly constructed in accordance with the present invention.
Figure 3:
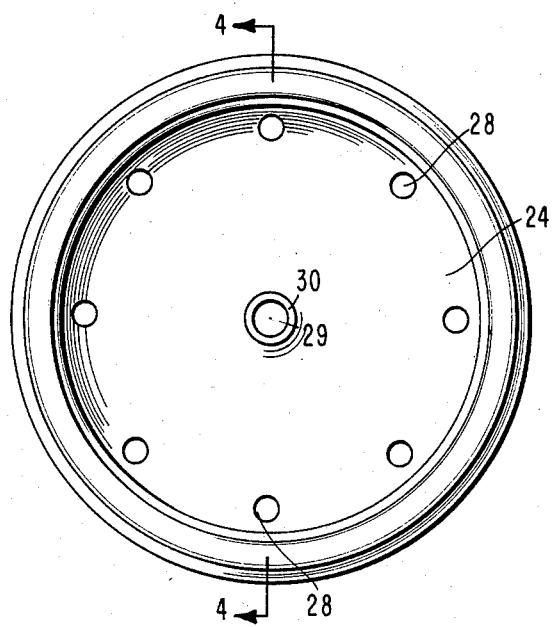
FIG. 3 is a top, plan view of the valve insert of FIG. 2.
Figure 4:
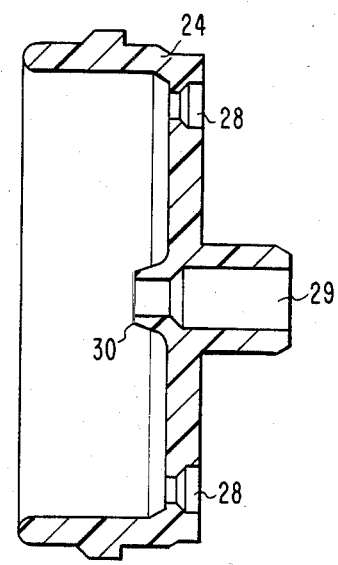
FIG. 4 is a side, cross-sectional view of the valve insert of FIG. 2.
Figure 2:
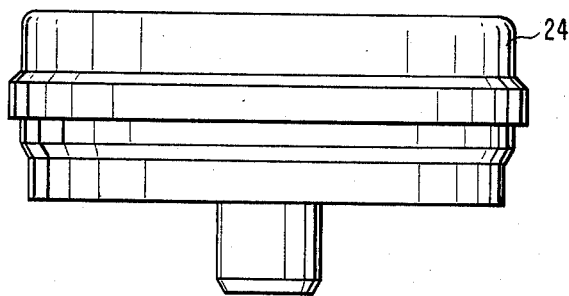
FIG. 2 is a side, elevational view of a valve insert useful in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a direct acting valve assembly which is superior in reliability and function over prior art designs. A problem with current designs is that close tolerances are necessary or misalignment may result in failure of the valve either immediately or over time. The necessity of such close tolerances results in higher manufacturing costs when employed in current designs. The present invention overcome these problems and provides a valve which is reliable in operation without requiring unduly high tolerances on the parts and the high costs associated therewith.

Referring in particular to the drawings there is shown a valve assembly constructed in accordance with the present invention. The assembly includes a valve body 10 and a guide tube 11. The valve body includes an annular inlet 12 and a central outlet 13 relative thereto. An annular portion 14 has an annular surface 15 located between the inlet and the outlet and provides a sealing surface as further described hereafter. A coupling portion 16 provides an inlet port in communication with the annular inlet. Mounted within the coupling portion is a finned insert 17, a flow control 18 and a retainer 19. An inlet screen (not shown) is typically installed upstream of the retainer 19 within the coupling portion.

The guide tube is secured to the valve body and includes a cylindrical guide portion 20 aligned with the outlet of the valve body. In the preferred embodiment as shown, the guide tube includes a cup-shaped portion 21 facing in the direction of the valve body and the valve body includes a complementarily shaped and facing cup-shaped portion 22. The outer surface of the cup-shaped portion of the guide tube is received adjacent the inner surface of the cup-shaped portion of the valve body. An annular seal 23 is provided to seal the connection of the guide tube with the valve body.

An insert 24 is received within the valve assembly and is secured with either of the valve body or the guide tube. It is preferred that the insert is secured to the guide tube since this permits a more reliable alignment of the upraised valve seat of the insert with the guide tube, which is important to alignment of particular components of these two members. As shown, the insert preferably includes a cup-shaped portion 25 facing in the direction of the guide tube and the outer surface of the cup-shaped portion 25 is received adjacent and aligns the insert with the inner surface of the cup-shaped portion 21 of the guide tube.

The insert includes a disc-shaped portion 26 which includes an annular surface positioned adjacent an annular seal 27 positioned in turn adjacent the annular surface 15 of the valve body. The components of the guide tube, insert and valve body are sized and positioned such that securement of the guide tube with the valve body forces the insert against the seal 27 to provide a fluid tight seal between the insert and the annular surface 15.

The insert includes several filtering inlet apertures 28 to permit flow of fluid from one side of the insert to the other side. The annular seal 27 is preferably of a lesser diameter than the disc-shaped portion of the insert. The inlet apertures 28 are then provided in a spaced relation in the area of the disc-shaped portion of the insert radially outward of the annular seal 27.

The insert includes a central aperture 29 which is aligned with and communicates with the outlet 13 of the valve body. An upraised valve seat 30 extends about the central aperture. The inlet apertures 28 are preferably smaller in diameter than the diameter of the central aperture 29 in order to provide the desired filtering effect.

A closure member 31 is received within the guide cylinder of the guide tube. The closure member carries a valve seal 32 which is positionable against the valve seat 30 of the insert. The closure member has a first position with the valve seal displaced from the valve seat, permitting fluid to flow from the annular inlet 12 through the inlet apertures 28 and then through the central aperture 29 and to and through the outlet of the valve body. The closure member also has a second position in which the valve seal is positioned in sealing relationship against the valve seat, and flow of fluid through the valve is precluded.

The assembly also includes means for moving the closure member between the first and second positions. This means may assume a variety of conventional types, and typically includes a solenoid valve action. As shown, a solendoid coil 33 is located about the closure member and is operable to move the closure member in the direction of the second position of the closure member. A spring 34 is positioned within the guide cylinder between the guide tube and the closure member and biases the closure member into the second position closing the valve. In operation, the valve has a normally closed condition, but upon energization of the solenoid the closure member is moved into the first, open position against the biasing force of the spring.

The materials for the valve assembly shown may be any of a variety of conventional materials. The configuration of the valve design permits the use of relatively loose tolerances because of the greater ease in obtaining an adequate seal between the flat, annular surface of the insert and the flat surface of the sealing member carried by the closure member.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A direct acting valve assembly which comprises:
   a valve body having an annular inlet and an outlet centrally located relative to the inlet, said body including an annular surface between the outlet and the inlet and defining a sealing seat for said valve body;
   a guide tube secured to said valve body, said guide tube defining a guide cylinder aligned coaxially with the annular inlet and with the annular surface of said valve body;
   an annular seal positioned adjacent the annular surface of said valve body, said seal including a central opening aligned and communicating with the outlet of said valve body;
   a stationary insert secured to one of said valve body and said guide tube, said insert including an annular surface positioned adjacent said annular seal and providing a fluid tight seal between said insert and the annular surface of said valve body, said insert including a central aperture aligned and communicating with the central opening of said annular seal and with the outlet of said valve body, said insert also defining at least one inlet aperture extending through said insert from a first side located in communication with the inlet of said valve body to a second side in a location communicable with the central aperture on the side opposite said annular seal, said insert further defining an upraised, valve seat on the side of said insert opposite said annular seal, the valve seat being generally coaxial with the central aperture and the central aperture extending therethrough;
   a closure member received and reciprocal within the guide cylinder of said guide tube;
   a valve seal positioned on the end of said closure member facing the valve seat of said insert;
   said closure member having a first position with said valve seal displaced from the valve seat of said insert allowing fluid to flow from the inlet of the valve body, through the inlet aperture of said insert and thereafter through the central aperture of said insert to the outlet of said valve body, said closure member having a second position with said valve seal positioned adjacent the valve seat of said insert preventing flow of fluid through the central aperture of said insert; and means for moving said closure member between the first and second positions to open and close the valve assembly.

2. The assembly of claim 1 in which said means in which said moving means includes a spring extending between said guide tube and said closure member and biasing said biasing member to the second position, and further includes a solenoid device operable to move said closure member to the first position in opposition to the biasing force of the spring.

3. The assembly of claim 1 in which said insert is secured to said guide tube.

4. The assembly of claim 3 in which said guide tube includes an annular, cup-shaped portion facing in the direction of said valve body, and in which said insert includes an annular, cup-shaped portion facing in the direction of said guide tube, the cup-shaped portion of said insert having an outer surface received adjacent the inner surface of the cup-shaped portion of said guide tube and positioning said insert relative said guide tube.

5. The assembly of claim 1 in which said insert includes a generally disc-shaped portion with the central aperture being positioned coaxially therewith.

6. The assembly of claim 5 in which said insert includes several inlet passageways extending through the disc-shaped portion of said insert, said annular seal having a diameter less than the diameter of the disc-shaped portion of said insert, the inlet passageways being located in the area of the disc-shaped portion radially outward of said annular seal.

7. The assembly of claim 6 in which said insert is secured to said guide tube.

8. The assembly of claim 7 in which said guide tube includes an annular, cup-shaped portion facing in the direction of said valve body, and in which said insert includes an annular, cup-shaped portion facing in the direction of said guide tube, the cup-shaped portion of said insert having an outer surface received adjacent the inner surface of the cup-shaped portion of said guide tube and positioning said insert relative said guide tube.

9. The assembly of claim 8 in which said valve body includes a cup-shaped portion facing in the direction of said guide tube, the cup-shaped portion of said guide tube having an outer surface received adjacent the inner surface of the cup-shaped portion of said valve body.

10. The assembly of claim 9 and which further includes an annular seal positioned between said guide tube and said valve body.

* * * * *

UNITED STATES PATENT AND TRADEMARK OFFICE
CERTIFICATE OF CORRECTION

PATENT NO. : 4,558,844

DATED : December 17, 1985

INVENTOR(S) : William R. Donahue, Jr.

It is certified that error appears in the above-identified patent and that said Letters Patent is hereby corrected as shown below:

In the Description of the Prior Art, in column 1, line 45, the patent number issued to Kolze should be --4,174,824-- instead of [4,178,824]. In column 1, line 47, the inventor name of [Kozel] should be --Kolze--.

In the Description of the Preferred Embodiment, in column 4, line 7, the word [second] should be replaced with the word --first--.

Signed and Sealed this

Eighth Day of April 1986

[SEAL]

Attest:

DONALD J. QUIGG

Attesting Officer

Commissioner of Patents and Trademarks